United States Patent [19]

Hoffman

[11] 3,819,375

[45]* June 25, 1974

[54] RELIEF IMAGES

[75] Inventor: Arnold Hoffman, Brookline, Mass.

[73] Assignee: Polaroid Corporation, Cambridge, Mass.

[ * ] Notice: The portion of the term of this patent subsequent to Oct. 3, 1989, has been disclaimed.

[22] Filed: Sept. 28, 1972

[21] Appl. No.: 292,866

Related U.S. Application Data

[63] Continuation-in-part of Ser. No. 93,439, Nov. 27, 1970, Pat. No. 3,695,876.

[52] U.S. Cl. .................................. 96/35, 96/94 BF

[51] Int. Cl. .............................................. G03c 5/00

[58] Field of Search ....................... 96/94 RF, 35, 36

[56] References Cited

UNITED STATES PATENTS

| | | | |
|---|---|---|---|
| 3,695,876 | 10/1972 | Hoffman | 96/29 R |
| 3,709,692 | 1/1973 | Haase et al. | 96/94 BF |

*Primary Examiner*—David Klein

[57] ABSTRACT

Relief images are prepared in a sheet of silver having a surface of silver bromide.

5 Claims, No Drawings

RELIEF IMAGES

CROSS REFERENCE TO RELATED APPLICATIONS

This application is a continuation-in-part of application Ser. No. 93,439, filed Nov. 27, 1970, now U.S. Pat. No. 3,695,876 issued Oct. 3, 1972.

BACKGROUND OF THE INVENTION

Copending application Ser. No. 93,439, filed Nov. 27, 1970, discloses and claims the preparation of a photosensitive element which comprises a layer of silver wherein a portion of said silver has been converted electrolytically to silver halide. The aforementioned application is incorporated herein in its entirety.

It is with the photosensitive elements of application Ser. No. 93,439 that the present invention is concerned.

SUMMARY OF THE INVENTION

It has been unexpectedly discovered that employing photosensitive elements comprising a layer of silver with a silver bromide surface thereof which is prepared by anodizing silver foil in the presence of bromide ion according to the procedure of application Ser. No. 93,439, can be employed to generate high resolution relief images.

DETAILED DESCRIPTION OF THE INVENTION

Copending application Ser. No. 93,439 discloses and claims a photosensitive element and a method for preparing said element which comprises converting a portion of a layer of silver to silver halide by imposing a constant current on said layer of silver in the presence of halide ion at a current density of about 0.5–8 milliamps per centimeter square to convert a depth of at least 3 microns apparent thickness of said silver based on Faraday's Law for the number of coulombs consumed for forming silver halide having a density of about 6.

The aforementioned application also discloses diffusion transfer and conventional processing of such photosensitive elements to provide conventional negatives and positive transfer images.

It has been unexpectedly discovered that a relief image can be formed in a silver-silver bromide photosensitive element prepared according to the above procedure. The relief image is obtained by exposing the silver-silver bromide photosensitive element to an exposure level of about $10^{13}$ photons per centimeter square to about $5 \times 10^{14}$ photons per centimeter square and then processing with a chemical developer by wet development techniques.

The following non-limiting example illustrates the novel process of the present invention.

EXAMPLE I

A 5 mil silver foil was anodized in the presence of 1 molar bromide ion at a current density of 2.0 mA/centimeter square for a length of time corresponding to a thickness for silver bromide of 9 microns according to the procedure of application Ser. No. 93,439. The thus-formed element was exposed with an unfiltered Xenon arc as a light source providing an exposure level of about $5 \times 10^{13}$ photons per centimeter square. Development was carried out by contacting the element with Kodak D19 Developer (Eastman Kodak Company, Rochester, New York) a commercial developer composed of:

| | | |
|---|---|---|
| Water | 500 | ml. |
| Kodak Elon | 2.0 | g. |
| Sodium sulfite | 90 | g. |
| Hydroquinone | 8.0 | g. |
| Sodium carbonate | 57.5 | g. |
| Potassium bromide | 5.0 | g. |
| Water to make 1 liter | | |

diluted 1:1 with water, for 60 seconds; 3 percent acetic acid for 60 seconds; and 10 percent sodium sulfite for 30 seconds. Observing the thus-developed photosensitive element showed that the image region appeared lighter than the non-image region. Both the image and non-image regions consist of a layer of about 1 micron thickness of silver. The image region has a high density of small particles and the non-image region has a relatively low density of large particles. The plane of the image region is about 1 micron lower, that is, depressed into the surface of the photosensitive element, than the plane of the non-image region.

The particle size of the developed silver in the unexposed region is approximately the same size as the initial silver bromide particle size. The particle size in the exposed region is substantially smaller than in the unexposed region. In addition, the particle density is higher in the exposed than in the unexposed region.

While not intending to be bound by any theory, it is believed that the positive image is obtained by the formation of finer more dense silver with a different covering power than the coarser less dense silver in the unexposed areas. The generation of the relief image indicates that the solubility of exposed silver bromide is greater than unexposed silver bromide.

It should be understood that as with the photosensitive element disclosed in application Ser. No. 93,439, the element employed in the present invention may be supported or unsupported. Similarly, chemical and spectral sensitization techniques may also be employed.

What is claimed is:

1. A method of providing a relief image wherein the image region has a relatively high density of particles smaller in size than the nonimage region and the nonimage region has a relatively low density of particles, the developed silver in the unexposed regions being approximately the same size as the initial silver bromide particles, which comprises exposing a photosensitive element comprising silver wherein a depth of at least 3 microns apparent thickness of said silver based on Faraday's law for the number of coulombs consumed for forming silver halide having a density of about 6 has been converted electrolytically to silver bromide, but not all of said silver has been converted, which comprises exposing said photosensitive element and subjecting said exposed photosensitive element to chemical development.

2. The method as defined in claim 1 wherein said exposure level is between about $10^{13}$ photons per centimeter square and $5 \times 10^{14}$ photons per centimeter square.

3. The method as defined in claim 1 wherein said photosensitive element is chemically sensitized.

4. The method as defined in claim 1 wherein said photosensitive element is spectrally sensitized.

5. The method as defined in claim 1 wherein said chemical development is carried out by contacting said exposed photosensitive element with hydroquinone.

* * * * *